US010562527B2

(12) United States Patent
Reckziegel et al.

(10) Patent No.: US 10,562,527 B2
(45) Date of Patent: Feb. 18, 2020

(54) METHOD AND DEVICE FOR CONTROLLING A VEHICLE

(71) Applicant: Robert Bosch GmbH, Stuttgart (DE)

(72) Inventors: Bastian Reckziegel, Kirchheim/Nabern (DE); Erich Sonntag, Marbach am Neckar (DE); Gian Antonio D' Addetta, Stuttgart (DE); Johannes Foltin, Ditzingen (DE); Sybille Eisele, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 222 days.

(21) Appl. No.: 15/688,051

(22) Filed: Aug. 28, 2017

(65) Prior Publication Data
US 2018/0065626 A1 Mar. 8, 2018

(30) Foreign Application Priority Data

Sep. 5, 2016 (DE) .......................... 10 2016 216 738

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2720/103* (2013.01); *B60W 2720/125* (2013.01); *B60W 2720/24* (2013.01)

(58) Field of Classification Search
CPC ............ B60W 30/09; B60W 30/0953; B60W 30/0956; B60W 2550/146; B60W 2720/103; B60W 2720/125; B60W 2720/24; B60W 30/08; B60W 2030/082; B60W 30/085; B60W 30/095–0956; B60W 50/0097; B60W 50/0098; B60W 2550/10
USPC ................. 700/301, 41, 93; 701/301, 41, 93
See application file for complete search history.

(56) References Cited

U.S. PATENT DOCUMENTS

| | | | |
|---|---|---|---|
| 2016/0059855 A1* | 3/2016 | Rebhan ................. | B60W 30/08 701/41 |
| 2016/0335892 A1* | 11/2016 | Okada ....................... | B60T 7/22 |
| 2017/0001637 A1* | 1/2017 | Nguyen Van ..... | B60W 50/0225 |
| 2017/0210383 A1* | 7/2017 | Nishimura ............ | B60W 30/09 |

FOREIGN PATENT DOCUMENTS

| | | |
|---|---|---|
| DE | 102011115223 A1 | 3/2013 |
| DE | 102012210344 A1 | 12/2013 |
| DE | 102013016724 A1 | 6/2014 |

\* cited by examiner

*Primary Examiner* — Bao Long T Nguyen
(74) *Attorney, Agent, or Firm* — Norton Rose Fulbright US LLP; Gerard Messina

(57) ABSTRACT

A method for controlling a vehicle. A piece of hazard area information, which represents at least one hazard area in the surroundings of the vehicle, and a piece of approach information, which represents an approach to the vehicle of at least one further vehicle driving next to the vehicle, are read in. Using the approach information, at least one collision parameter of a collision between the vehicle and the further vehicle is ascertained. Finally, a control signal is generated, using the collision parameter and the hazard area information, to steer the vehicle in a direction facing away from the hazard area.

13 Claims, 4 Drawing Sheets

METHOD AND DEVICE FOR CONTROLLING A VEHICLE

RELATED APPLICATION INFORMATION

The present application claims priority to and the benefit of German patent application no. 10 2016 216 738.3, which was filed in Germany on Sep. 5, 2016, the disclosure of which is incorporated herein by reference.

FIELD OF THE INVENTION

The present invention is directed to a device and to a method. The present invention also relates to a computer program.

BACKGROUND INFORMATION

Driver assistance systems exist, with the aid of which a vehicle may be kept in the lane. The regulation is in particular based on the road geometry. In general, a fixed distance from roadway markings is maintained to keep the vehicle centered. Only in curve situation may a deviation from the centered mode of driving occur. The driver assistance systems may be configured in such a way that the lateral acceleration during driving is low to prevent impairing the comfort of the driver. Furthermore, lane change assistance systems exist for comfortably changing lanes. These systems are intended to avoid accidents.

Integrated safety systems may utilize surroundings sensors such as video and radar sensors, as they are frequently used for comfort systems or assistance systems, to predict accidents. Possible system reactions range, for example, from a crash prediction, which in general is confirmed by contact sensors prior to an airbag deployment, also referred to as integrated collision detection side or IDS, to systems which already respond prior to the impact, also referred to as pre-triggers.

Other integrated safety functions have the goal of mitigating the accident severity by optimally aligning the opposing accident parties with respect to one another, also referred to as crash alignment.

Furthermore, brake assistance systems are known, also referred to as secondary collision mitigation, which are able to brake a vehicle to a standstill after an initial collision with an opposing accident party to prevent secondary collisions, or to mitigate the accident severity of secondary collisions, for example when the driver is injured or unconscious.

SUMMARY OF THE INVENTION

Against this background, the approach described here introduces a method for controlling a vehicle, a device which uses this method, and finally a corresponding computer program as described herein. The measures described herein allow advantageous refinements of and improvements on the device described herein.

A method for controlling a vehicle is introduced, the method including the following steps:
reading in a piece of hazard area information, which represents at least one hazard area in the surroundings of the vehicle, and a piece of approach information, which represents at least one further vehicle driving next to the vehicle which is approaching the vehicle;
ascertaining at least one collision parameter of a collision between the vehicle and the further vehicle, using the piece of approach information; and
generating a control signal, using the collision parameter and the piece of hazard area information, to steer the vehicle in a direction facing away from the hazard area.

A vehicle may be understood to mean a motor vehicle, such as a passenger car or a truck. In particular, the vehicle may be a partially, highly or fully automated vehicle. A hazard area may, for example, be understood to mean a possible collision object, such as a tree, a rock, a post, a person or a parked or oncoming vehicle. The hazard area, however, may also be an unguarded precipice or a, for example unpaved, shoulder. The piece of hazard area information may, for example, represent a lateral or longitudinal position of the hazard area relative to the vehicle. The further vehicle may be a passing vehicle, for example. The piece of approach information may, for example, be a relative speed, a relative acceleration or a distance of the further vehicle relative to the vehicle, or also a trajectory of the further vehicle. Depending on the specific embodiment, the piece of hazard area information or the piece of approach information may be a piece of information generated using a surroundings sensor of the vehicle. The piece of approach information may also be a piece of information generated using a pressure or acceleration sensor of the vehicle, for example, which may be generated by the contact with another vehicle, for example. The piece of hazard area information or the piece of approach information may alternatively be read in via a communication interface of the vehicle, such as for car-to-car or car-to-infrastructure communication.

The collision may be a predicted, for example with the aid of a surroundings sensor, or an actual collision between the vehicle and the further vehicle. A collision parameter may be a predicted or actual momentum, which acts on the vehicle during the collision, a collision point in time or a collision location.

The control signal may be generated, for example, for activating a steering or brake actuator or an engine control unit of the vehicle.

The piece of hazard area information and/or the piece of approach information may be read in, in the step of reading in, in particular prior to and/or during the collision. In the step of ascertaining, the collision parameter may also in particular be ascertained prior to and/or during the collision.

The approach described here is based on the finding that it is possible, by automatically countersteering, to prevent a vehicle which is pushed laterally by another vehicle, for example suddenly cutting into the lane, from colliding with a hazard area, such as an object situated on the roadside. In particular, a passing vehicle, in an effort to avoid oncoming traffic, may push another vehicle so far off the road when steering back into its own driving lane that this other vehicle is placed at risk. The pushed vehicle may now generate a corresponding counter momentum, for example based on a prediction of a lateral collision between the vehicle sides of the two vehicles, such as by slight countersteering, whereby the driver of the pushed vehicle may be protected against a secondary collision with a laterally located hazard area.

According to one specific embodiment, in the step of ascertaining, a momentum value of a momentum transmitted during the collision from the further vehicle to the vehicle may be ascertained as the collision parameter. In a step of determining, a counter momentum value dependent on the momentum value may be determined, using the collision parameter and the piece of hazard area information. Accordingly, in the step of generating, the control signal may be generated using the counter momentum value. The momentum value may refer to a momentum transmitted during a collision which has occurred or to a momentum presumably transmitted during an impending collision. The collision parameter may have been detected with the aid of surroundings sensors, for example. This is advantageous when a counter momentum is to be built up already prior to an actual contact. In this way, the vehicle may be prevented with high reliability from crashing against the hazard area when colliding with the further vehicle.

Furthermore, in the step of ascertaining, a momentum value may be ascertained as the collision parameter, which represents a momentum predetermined using a surroundings sensor system of the vehicle. In this way, the necessary counter momentum may already be determined prior to an actual collision, i.e., without a transmitted momentum, based on a momentum estimated or anticipated with the aid of the surroundings sensor system, so that it is possible to act already prior to the contact.

Instead of explicitly calculating a momentum to be expected, a fixed momentum may also be used per vehicle type to determine the counter momentum value. The fixed momentum may be indirectly linked to a range of a momentum intensity, for example. For example, a larger momentum may be used for a truck or an SUV than for a compact car. The vehicle type may be determined via a surroundings sensor system, for example. It is possible to use a fixed momentum and/or a momentum intensity per vehicle type independently of a certain relative speed.

Alternatively, it is also possible to assume and/or estimate a weight per vehicle type, and to determine/estimate a momentum based on a relative speed ascertained, for example, with the aid of a surroundings sensor system. For the estimation of the weight, for example, the volume of a vehicle may be ascertained or estimated, and a weight estimation may be carried out based on the volume and an assumed weight per volume. It is also possible to compare recognized vehicles to a database, and to ascertain a weight of the vehicle based on the database. Moreover, it is conceivable to ascertain the number of occupants and, if necessary, the load condition with the aid of a surroundings sensor system to achieve a better weight estimation.

A momentum need not necessarily be understood here to mean a product of vehicle weight and its speed, or a relative speed. The speed or relative speed alone is sufficient for one specific embodiment of the method. The momentum, or a counter momentum value, may consequently also only be a speed or a relative speed.

According to one further specific embodiment, in the step of determining furthermore a control point in time, at which the control signal is to be generated, may be determined, using the counter momentum value. In the step of generating, the control signal may be generated at the control point in time. In this way, timely countersteering of the vehicle may be ensured.

The method may moreover include a step of comparing the counter momentum value to a reference value. In the step of determining, the control point in time may be determined in such a way that, in the step of generating, the control signal is generated after the collision between the vehicle and the further vehicle when it is derived from the comparison that the counter momentum value is smaller than the reference value. In addition or as an alternative, in the step of determining, the control point in time may be determined in such a way that, in the step of generating, the control signal is generated prior to and/or during the collision between the vehicle and the further vehicle when it is derived from the comparison that the counter momentum value is greater than the reference value. In this way, excessive or insufficient countersteering of the vehicle may be avoided.

Furthermore, the method may include a step of transmitting the counter momentum value to a communication interface for communication with at least one other road user. The communication interface may be a wireless interface to other vehicles or to an infrastructure unit, for example, such as a traffic light or a central data server. The efficiency of the method may be increased by this specific embodiment.

According to one further specific embodiment, a lateral distance of the vehicle from the hazard area may be read in as the piece of hazard area information in the step of reading in. In addition or as an alternative, a piece of information which represents a lateral speed, a lateral acceleration, a distance or an approach angle of the further vehicle relative to the vehicle, a contact of the vehicle by the further vehicle, or a size, a weight or a vehicle type of the further vehicle, or a combination of at least two of the described variables, may be read in as the piece of approach information. As a result of this specific embodiment, it is possible to apply the countersteering input of the vehicle with high precision.

It is advantageous when, in the step of generating, the control signal is generated to activate a steering system of the vehicle or, in addition or as an alternative, to decelerate the vehicle to one side. In this way, the vehicle may be steered with low deceleration in the direction facing away from the hazard area.

Furthermore, in the step of reading in, a piece of roadway condition information which represents a course of a roadway traveled by the vehicle may be read in. Accordingly, in the step of generating, the control signal may be generated using the piece of roadway information. For example, the piece of roadway information may represent a course of a lane marking or of a roadside, or a roadway or lane width. The piece of roadway information may have been detected by a surroundings sensor of the vehicle, for example. With this specific embodiment, it may be ensured that the vehicle does not run off the roadway during the collision with the further vehicle.

This method may be implemented in software or hardware or in a mixed form made up of software and hardware, for example in a control unit.

The approach described here furthermore creates a device which is configured to carry out, activate or implement the steps of one variant of a method described here in corresponding devices. The object underlying the present invention may also be achieved quickly and efficiently by this embodiment variant of the present invention in the form of a device.

For this purpose, the device may include at least one processing unit for processing signals or data, at least one memory unit for storing signals or data, at least one interface to a sensor or an actuator for reading in sensor signals from the sensor or for outputting data signals or control signals to the actuator and/or at least one communication interface for reading in or outputting data which are embedded into a communication protocol. The processing unit may be a signal processor, a microcontroller or the like, for example, it being possible for the memory unit to be a Flash memory, an EPROM or a magnetic memory unit. The communication interface may be configured to read in or output data wirelessly and/or in a wire-bound manner, a communication interface which is able to read in or output wire-bound data being able to read these data in, for example electrically or optically, from a corresponding data transmission line or output these into a corresponding data transmission line.

A device may presently be understood to mean an electrical device which processes sensor signals and outputs control and/or data signals as a function thereof. The device may include an interface which may be configured as hardware and/or software. In the case of a hardware design, the interfaces may, for example, be part of a so-called system ASIC which includes a wide variety of functions of the device. However, it is also possible for the interfaces to be separate integrated circuits, or to be at least partially made up of discrete elements. In the case of a software design, the interfaces may be software modules which are present on a microcontroller, for example, in addition to other software modules.

In one advantageous embodiment, the device carries out a control of the vehicle. For this purpose, the device may access sensor signals, for example, such as acceleration, pressure, steering angle or surroundings sensor signals. The activation takes place via actuators, such as brake or steering actuators, or an engine control unit of the vehicle.

In addition, a computer program product or computer program is advantageous, having program code which may be stored on a machine-readable carrier or storage medium such as a semiconductor memory, a hard disk memory or an optical memory, and which is used to carry out, implement and/or activate the steps of the method according to one of the specific embodiments described above, in particular if the program product or program is executed on a computer or a device.

Exemplary embodiments of the present invention are shown in the drawings and are described in greater detail in the following description.

In the following description of favorable exemplary embodiments of the present invention, identical or similar reference numerals are used for similarly acting elements shown in the different figures, and a repeated description of these elements is dispensed with.

DETAILED DESCRIPTION

Figure 1:
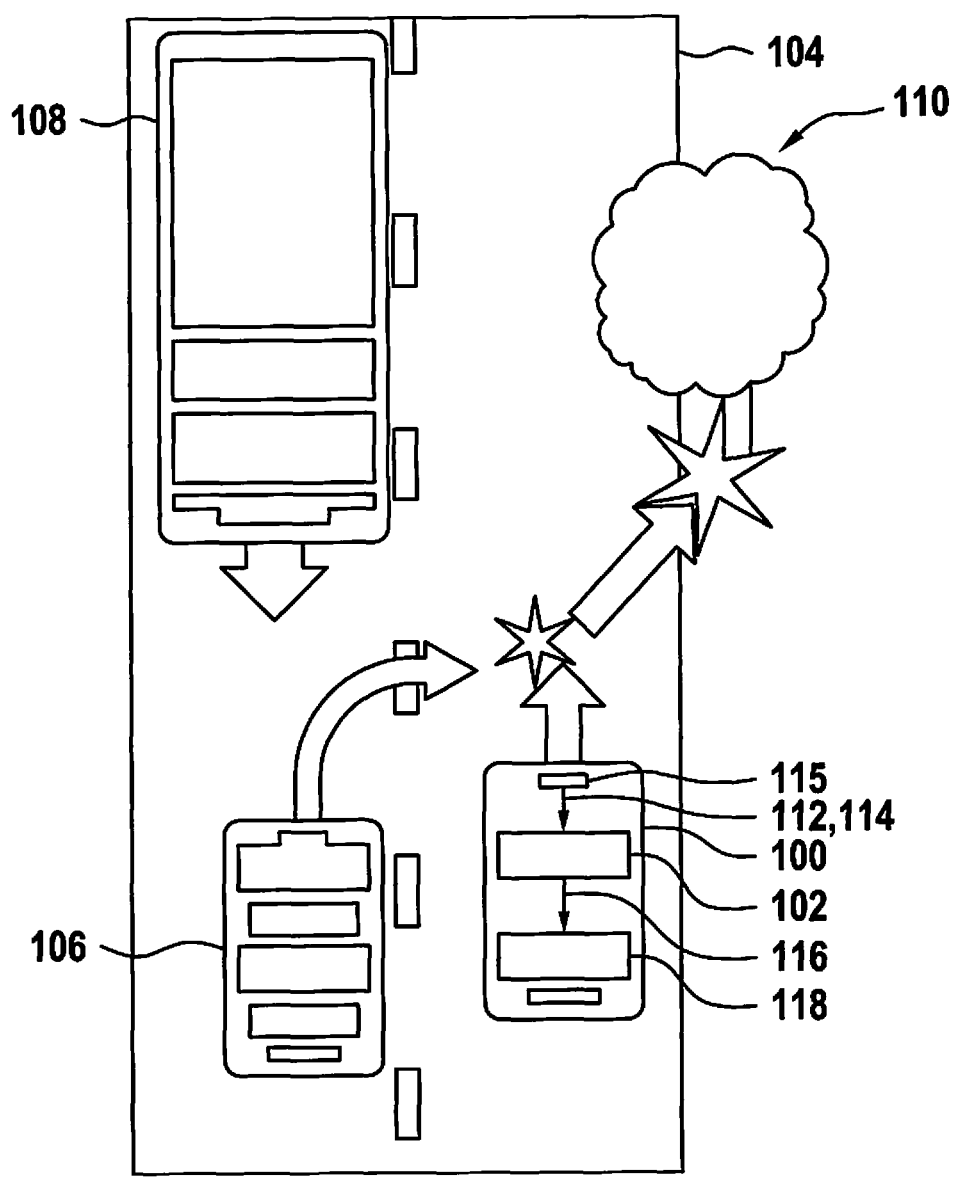
FIG. 1 shows a schematic representation of a vehicle including a device according to one exemplary embodiment.

FIG. 1 shows a schematic representation of a vehicle 100 including a device 102 according to one exemplary embodiment. Vehicle 100 drives on a two-lane roadway 104 by way of example and is passed by a further vehicle 106. Further vehicle 106 is about to cut into the lane of vehicle 100 in order to avoid an oncoming vehicle 108, in this instance a truck. Vehicle 100 drives toward a hazard area 110 situated on the right edge of roadway 104.

Hazard area 110 is illustrated by a tree by way of example in FIG. 1. During a collision between the two vehicles 100, 106, there is now the risk that vehicle 100, as a result of the force of the collision, is thrown off course in such a way that it crashes against hazard area 110, thus resulting in a secondary collision of vehicle 100. The respective locations of the two collisions are marked schematically with two stars in FIG. 1.

Device 102 is configured to read in a piece of hazard area information 112 representing hazard area 110 and a piece of approach information 114. Piece of approach information 114 represents further vehicle 106 approaching vehicle 100 during the passing or cutting-in maneuver. According to this exemplary embodiment, device 102 reads in the two pieces of information 112, 114 from a surroundings sensor 115 for detecting surroundings of vehicle 100. Alternatively, at least piece of approach information 114 is provided by an acceleration or pressure sensor of vehicle 100, for example upon contact of further vehicle 106 with vehicle 100. Furthermore, device 102 is configured to generate a control signal 116, using the two pieces of information 112, 114, which steers vehicle 100 in a direction facing away from hazard area 110 in a timely manner to avoid the secondary collision with hazard area 110. For example, at least one actuator 118 of vehicle 100, such as a steering or brake actuator, is suitably activated with the aid of control signal 116 to effectuate a corresponding change of direction.

The trajectories of the three vehicles 100, 106, 108 are each indicated by arrows.

Different exemplary embodiments of the approach described here are described again hereafter in other words.

Passing maneuvers in blind spots may become very dangerous since oncoming traffic may emerge suddenly and unexpectedly. Depending on the relative speed of passing vehicle 106 and of oncoming vehicle 108, the situation may be mitigated by a deceleration of passing vehicle 106. At a high relative speed, the deceleration may not necessarily avert the risk. In addition to a high relative speed, the reaction of vehicle 100 may also prevent a mitigation of the situation, for example when synchronous braking takes place, and thus further vehicle 106 is prevented from cutting into the lane. The driver of further vehicle 106 will thus attempt to mitigate the situation by steering back into the right lane. This may take place consciously or unconsciously since the driver instinctively wants to protect his or her life.

The steering back action causes a collision between the two vehicles 100, 106, vehicle 100 experiencing a lateral momentum. The lateral momentum may cause vehicle 100 to run off roadway 104 and, for example, to have a serious crash against a tree situated next to roadway 104. Since the accident, from the lateral impact to the impact with the tree, happens within a very short time, or vehicle 100 after the impact behaves differently than after a steering maneuver, it is not very likely that a simple lane-keeping assistant system would be able to prevent the accident. Although a secondary collision mitigation function, such as was mentioned above, could attempt to decelerate vehicle 100 in the lane, this is difficult due to the shortness of the available time.

To protect himself or herself, the driver of further vehicle 106 carries out a partially inappropriately strong steering movement, for example. After the impact of further vehicle 106 with vehicle 100, vehicle 100 thus runs off roadway 104 further than is necessary. This is above all due to the fact that the driver of vehicle 100 does not anticipate and is not able to anticipate a lateral impact.

Via one or multiple surroundings sensors 115, vehicle 100 detects a possible hazard area 110 on the roadside, for example in the form of a tree, of a rock, of a pillar, of a tanker truck, of a person or of an unguarded precipice. In addition to the presence of hazard area 110, surroundings sensor 115 also, for example, detects its longitudinal or lateral position relative to vehicle 100 and transmits these data in the form of hazard area information 112 to device 102.

Furthermore, vehicle 100 detects passing vehicle 106 and its approach to vehicle 100. From the approach, for example from a lateral speed or acceleration, a distance between the two vehicles 100, 106 or optional further parameters of further vehicle 106, for example a size, a vehicle type, a weight or an approach angle, device 102 ascertains a collision parameter, for example the presumable momentum during the collision between the two vehicles 100, 106. From the, in particular, lateral position of hazard area 110 and the collision parameter, i.e., for example, the presumable momentum of further vehicle 106, according to one exemplary embodiment device 102 ascertains a counter momentum, which is necessary to prevent vehicle 100 from colliding with hazard area 110 after the initial collision with further vehicle 106, or to enter the area of influence of hazard area 110, for example when hazard area 110 is the edge of the road.

In addition to the protection of its own driver, this may also be considered as a kind of orientation aid for further vehicle 106. Further vehicle 106 has sufficient space or a maximally available space to prevent its collision, without placing vehicle 100 at risk at the same time. The steering maneuver of further vehicle 106 becomes more controlled due to the interception of the already inevitable accident and places fewer road users at risk.

The primary goal, however, is to protect the driver of vehicle 100 since further vehicle 106, due to cooperative behavior of oncoming vehicle 108, typically thereafter is given even more space.

Instead of a vehicle, the oncoming object may also be a general hazard area for the passing driver, for example objects situated on roadway 104, such as trees, rocks, cargo, stationary vehicles, wild animals or also road users particularly at risk, such as pedestrians or bicyclists, who may provoke a strong response by the passing driver.

In principle, the hazard area for the two vehicles 100, 106 may be same objects. In the case of passing vehicle 106, however, the hazard area is generally situated ahead of the vehicle at the start of the situation, and beside the driving path at the end of the situation, and in the case of vehicle 100 it is situated beside the driving path at the start, and after the collision ahead of the vehicle or also, in the case of automatic countersteering with the aid of device 102, beside the driving path.

According to one exemplary embodiment, device 102 determines a control point in time at which the counter momentum is generated, as a function of an intensity of the required counter momentum. For example, a small counter momentum may be sufficient for countersteering after the collision. Such a small counter momentum may be generated by a standard lane-keeping assistant system, for example. If a large counter momentum is necessary, countersteering prior to the collision may be sufficient. The advantage is in the large tolerance with respect to measuring errors: When the countersteering does not take place until after the contact between the two vehicles 100, 106, then a plausibility check is carried out, for example via a contact sensor of vehicle 100, so that a potentially unpleasant countersteering for the driver is prevented.

According to one further exemplary embodiment, device 102 takes a geometry of further vehicle 106 or of the oncoming object and the road conditions into consideration in the generation of control signal 116. In this way, for example, the counter momentum is adapted so markedly that further vehicle 106 is protected, and vehicle 100, for the protection of its own driver, does not drive too closely to hazard area 110. This has the advantage that the reaction is adapted to the specific driving situation, and vehicle 100 is not pushed away so strongly to the edge of the road or beyond the edge of the road toward hazard area 110. Traversing the edge of the road carries the risk that vehicle 100 may start skidding due to the undefined surface of the shoulder. As long as passing vehicle 106 remains sufficiently protected, device 102 through suitable countersteering prevents vehicle 100 from veering too far off roadway 104 beyond the edge of the road.

Optionally, device 102 reports the counter momentum via an air interface to other road users, so that these may prepare. Oncoming vehicle 108, for example, may thus make even more room or, in turn, prepare for a side collision.

According to one further exemplary embodiment, vehicle 100 does not detect further vehicle 106 with the aid of surroundings sensor 115, for example in the case of an exclusively anticipatory sensor system, but the reaction is detected relatively late by a side collision sensor of vehicle 100, and the counter momentum is generated by a deliberate braking intervention with the aid of ESP, for example. This may take place in a model-based manner, for example assuming a collision with a compact car. In this way, the approach described here may be implemented particularly cost-effectively.

According to one further exemplary embodiment, approach information 114 is sent via cooperative systems, such as via car-to-car communication, to vehicle 100. For example, data such as geometry or speed of further vehicle 106 are transmitted as approach information 114 to vehicle 100 and utilized for the determination of the procedure, for example for the application of the counter momentum.

Figure 2:
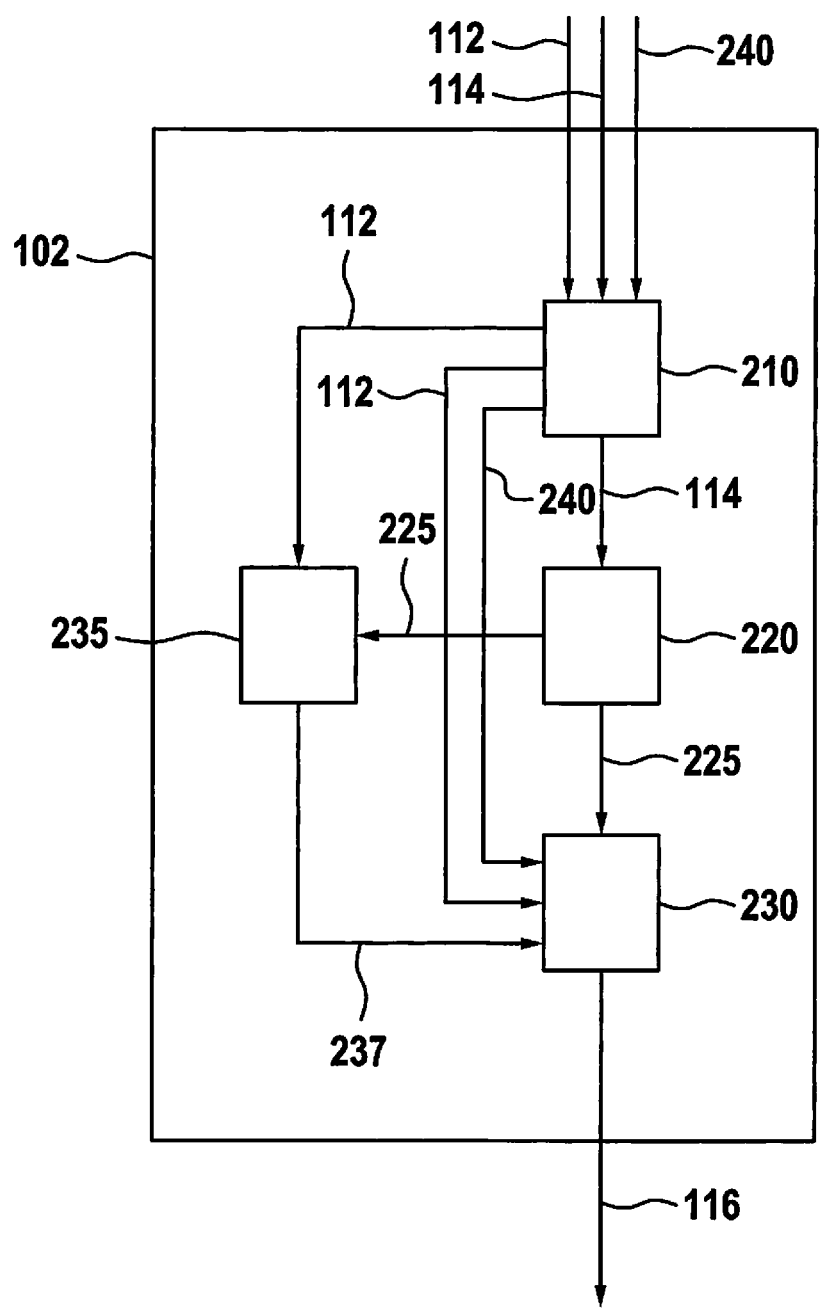
FIG. 2 shows a schematic representation of a device according to one exemplary embodiment.

FIG. 2 shows a schematic representation of a device 102 according to one exemplary embodiment, for example a device described above based on FIG. 1. Device 102 includes a read-in unit 210 for reading in hazard area information 112 and approach information 114. For example, read-in unit 210 is configured to read in at least one of the two pieces of information 112, 114 via a communication interface for the communication with other road users or a central data server. For example, read-in unit 210 is configured for the data exchange via car-to-car or car-to-infrastructure communication. In general, however, read-in unit 210 reads in hazard area information 112, and above all approach information 114, from on-board sensors. The reading in of the two pieces of information 112, 114 may alternatively also take place via a wired data link. An ascertainment unit 220 is configured to ascertain at least one collision parameter 225 of a presumable or also actual collision between the vehicle and the further vehicle, using approach information 114. In particular, ascertainment unit 220 is configured to ascertain a momentum value, which represents a momentum transmitted during the impact of the further vehicle with the vehicle, as collision parameter 225. A generation unit 230 is configured to receive piece of hazard area information 112 from read-in unit 210, and collision parameter 225 from ascertainment unit 220, and to generate control signal 116, using hazard area information 112 and collision parameter 225.

According to this exemplary embodiment, device 102 includes an optional determination unit 235, which is configured to receive collision parameter 225 from ascertainment unit 220, and piece of hazard area information 112 from read-in unit 210, and to use these to determine a counter momentum value 237 of a counter momentum necessary for countersteering dependent on the momentum value, and forward this to generation unit 230. Generation unit 230 is configured to generate control signal 116 using counter momentum value 237.

Optionally, determination unit 235 is configured to output counter momentum value 237 to the communication interface. In this way, the counter momentum value may be received or further processed by other road users, for example.

According to one further exemplary embodiment, read-in unit 210 is configured to read in a piece of roadway information 240, which represents a course of the roadway traveled by the vehicle, in addition to hazard area information 112 and to approach information 114. Read-in unit 210 forwards roadway information 240 to generation unit 230, which processes roadway information 240 for the generation of control signal 116.

Figure 3:
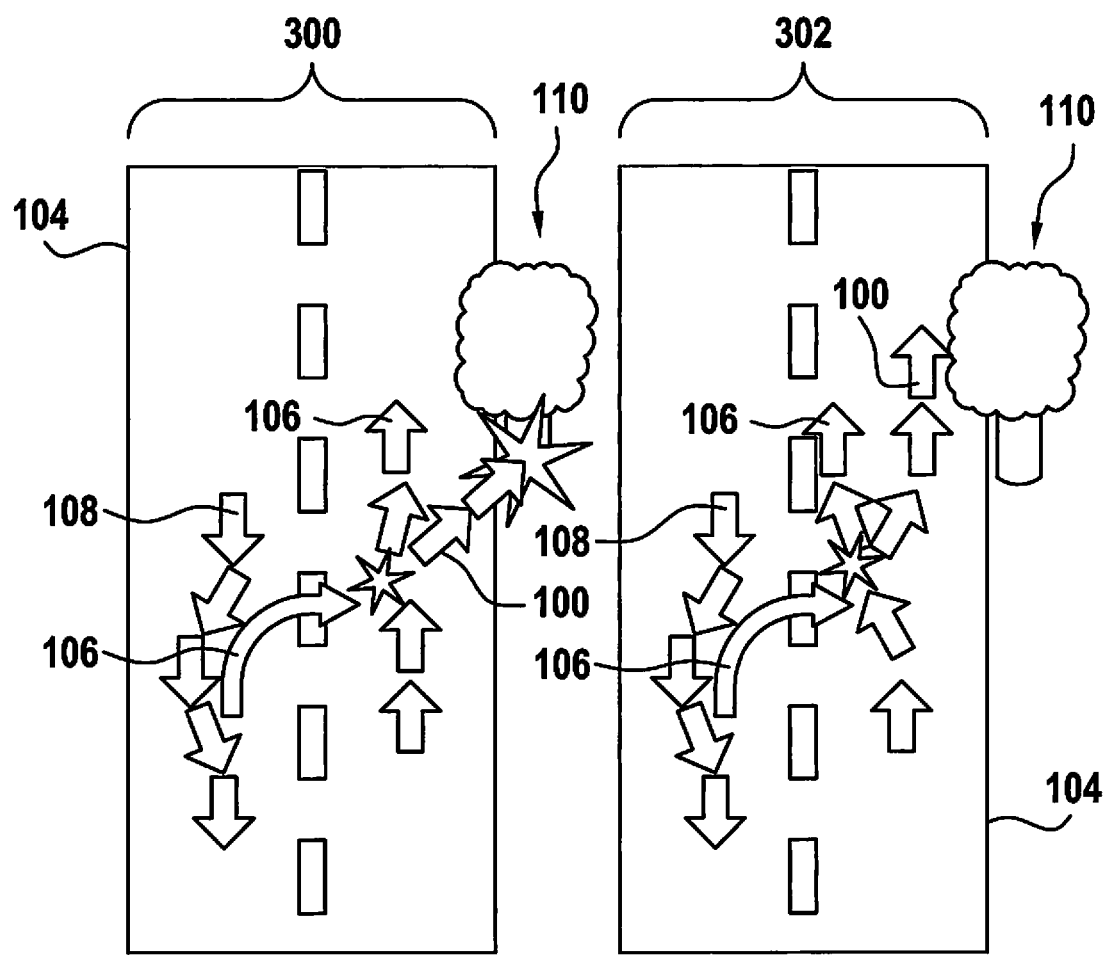
FIG. 3 shows a schematic representation of a collision between a vehicle including a device according to one exemplary embodiment and a further vehicle.

FIG. 3 shows a schematic representation of a collision between a vehicle 100 including a device 102 according to one exemplary embodiment and a further vehicle 106. Shown are the trajectories of the three vehicles 100, 106, 108 from FIG. 1. The arrows represent the respective movement directions of the three vehicles. The dark arrows extending close to hazard area 110 represent a trajectory of vehicle 100, the light arrows represent a trajectory of further vehicle 106, and the dark arrows extending in the left lane represent a trajectory of oncoming vehicle 108. Shown are a first image 300, which represents the course of the trajectories of the three vehicles without intervention by the device for controlling vehicle 100, and a second image 302, which represents the course of the trajectories of the three vehicles with intervention by the device for controlling vehicle 100.

Oncoming vehicle 108 carries out the same movement in both traffic situations since it is not influenced by the countersteering of vehicle 100. Oncoming vehicle 108 attempts to prevent the accident by a minor evasive maneuver.

The initial behavior of further vehicle 106, i.e., its evasive movement in the direction of vehicle 100 prior to the collision, is also the same in both cases and represented by a curved arrow. A small star represents the point in time of the collision between the two vehicles 100, 106, a lateral collision in this case. It is not possible to avoid the collision by the behavior of further vehicle 106.

In image 300, vehicle 100 is driving straight ahead. During the lateral collision, vehicle 100 experiences a strong lateral momentum, as a result of which the driving direction is changed toward hazard area 110. Vehicle 100 thus crashes frontally against hazard area 110, characterized by a large star, which symbolizes the high risk of injury during this impact. After the lateral collision, further vehicle 106 initially continues to drive toward the right edge of the road since the momentum from the evasive maneuver is very great, i.e., greater than necessary. After the lateral collision, further vehicle 106 is situated, for example, in the prior location of vehicle 100 since this was pushed off roadway 104. In image 302, in contrast, the device of vehicle 100 already measures the behavior of passing vehicle 106 prior to the lateral collision and changes the direction of vehicle 100 slightly to intercept the lateral impact to some degree. After the lateral impact, vehicle 100 moves only slightly still in the direction of hazard area 110 and may then be intercepted, for example with the aid of secondary collision mitigation, by an emergency braking function to prevent subsequent collisions after an initial collision. Further vehicle 106 receives a slight counter momentum and, in this example, again drives to some degree in the direction of oncoming vehicle 108. Alternatively, further vehicle 106 could also just simply continue to drive straight ahead. However, due to the evasive maneuver of oncoming vehicle 108, there is sufficient room, so that severe accidents may be avoided for all road users.

Figure 4:
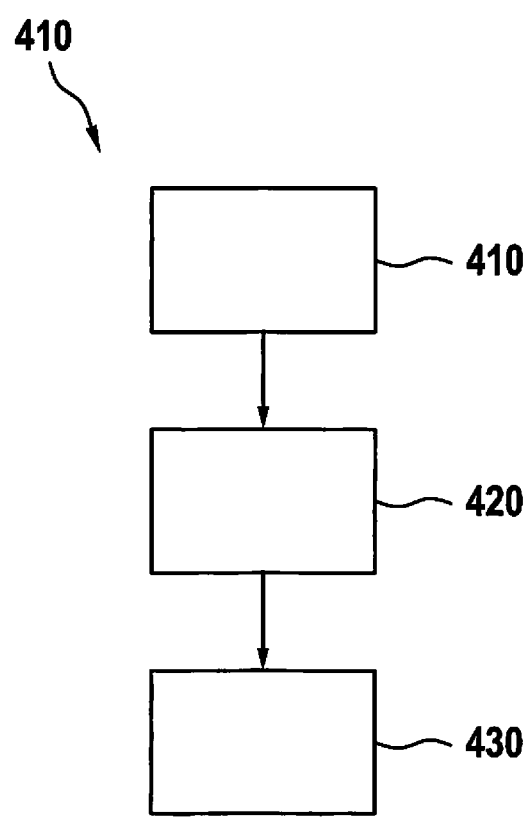
FIG. 4 shows a flow chart of a method according to one exemplary embodiment.

FIG. 4 shows a flow chart of a method 400 according to one exemplary embodiment. Method 400 for controlling a vehicle may be carried out in conjunction with a device described above based on FIGS. 1 through 3, for example. Method 400 includes a step 410 in which of hazard area information and the approach information are read in. In a further step 420, the collision parameter is ascertained, using the approach information. Finally, in a step 430, the control signal is generated, using the collision parameter and the hazard area information.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method for controlling a vehicle, the method comprising:
   reading in a piece of hazard area information, which represents at least one hazard area in the surroundings of the vehicle, and a piece of approach information, which represents an approach to the vehicle of at least one further vehicle driving beside the vehicle;
   ascertaining at least one collision parameter of a collision between the vehicle and the further vehicle, using the approach information;
   determining a control point in time, the control point in time being prior to the collision between the vehicle and the further vehicle; and
   generating a control signal, using the collision parameter and the hazard area information, at the control point in time to steer the vehicle in a direction facing away from the hazard area and to intercept the further vehicle.

2. The method of claim 1, further comprising:
   wherein, in the ascertaining, a momentum value of a momentum transmitted during the collision from the further vehicle to the vehicle is ascertained as the collision parameter, and
   determining a counter momentum value dependent on the momentum value, using the collision parameter and the piece of hazard area information;
   wherein in the generating, the control signal is generated using the counter momentum value.

3. The method of claim 2, wherein the momentum value represents a momentum predetermined using a surroundings sensor system of the vehicle.

4. The method of claim 2, wherein, in the determining, the control point in time, at which the control signal is to be generated, is determined using the counter momentum value.

5. The method of claim 4, further comprising:
   comparing the counter momentum value to a reference value, wherein, in the determining, the control point in time is determined so that, in the generating, the control signal is generated prior to the collision between the vehicle and the further vehicle when it is derived from the comparison that the counter momentum value is greater than the reference value.

6. The method of claim 2, further comprising:
transmitting the counter momentum value to a communication interface for communication with at least one other road user.

7. The method of claim 1, wherein, in the reading in, a lateral distance of the vehicle from the hazard area is read in as the hazard area information.

8. The method of claim 1, wherein, in the generating, the control signal is generated to activate a steering system of the vehicle and/or to decelerate the vehicle to one side.

9. The method of claim 1, wherein, in the reading in, a piece of roadway information, which represents a course of a roadway traveled by the vehicle, is read in, and, in the generating, the control signal is generated using the roadway information.

10. The method of claim 1, wherein, in the reading in, a piece of information is read in as the approach information, the piece of information representing at least one of: a lateral speed of the further vehicle relative to the vehicle, a lateral acceleration of the further vehicle relative to the vehicle, a distance of the further vehicle relative to the vehicle, an approach angle of the further vehicle relative to the vehicle, a contact of the vehicle by the further vehicle, a size of the further vehicle, a weight of the further vehicle, or a vehicle type of the further vehicle.

11. A device for controlling a vehicle, comprising:
a reading arrangement to read in a piece of hazard area information, which represents at least one hazard area in the surroundings of the vehicle, and a piece of approach information, which represents an approach to the vehicle of at least one further vehicle driving beside the vehicle;
an ascertaining arrangement to ascertain at least one collision parameter of a collision between the vehicle and the further vehicle, using the approach information;
a determining arrangement to determine a control point in time, the control point in time being prior to the collision between the vehicle and the further vehicle; and
a generating arrangement to generate a control signal, using the collision parameter and the hazard area information, at the control point in time to steer the vehicle in a direction facing away from the hazard area and to intercept the further vehicle.

12. A non-transitory machine-readable medium having a computer program, which when executed by a processor causes a method for controlling a vehicle to be performed, the method comprising:
reading in a piece of hazard area information, which represents at least one hazard area in the surroundings of the vehicle, and a piece of approach information, which represents an approach to the vehicle of at least one further vehicle driving beside the vehicle;
ascertaining at least one collision parameter of a collision between the vehicle and the further vehicle, using the approach information;
determining a control point in time, the control point in time being prior to the collision between the vehicle and the further vehicle; and
generating a control signal, using the collision parameter and the hazard area information, at the control point in time to steer the vehicle in a direction facing away from the hazard area and to intercept the further vehicle.

13. The non-transitory machine-readable medium of claim 12, the method further comprising:
wherein, in the ascertaining, a momentum value of a momentum transmitted during the collision from the further vehicle to the vehicle is ascertained as the collision parameter, and
determining a counter momentum value dependent on the momentum value, using the collision parameter and the piece of hazard area information;
wherein in the generating, the control signal is generated using the counter momentum value.

* * * * *